(12) United States Patent
Feng et al.

(10) Patent No.: US 12,744,462 B2
(45) Date of Patent: Sep. 22, 2026

(54) FLYING CAPACITOR CONVERTER, VOLTAGE CONVERTER AND ENERGY STORAGE SYSTEM WITH SAME

(71) Applicant: Delta Electronics, Inc., Taoyuan City (TW)

(72) Inventors: Bo Feng, Shanghai (CN); Tengshen Zhang, Shanghai (CN); Linfeng Zhong, Shanghai (CN); Yafeng Wang, Shanghai (CN)

(73) Assignee: Delta Electronics, Inc., Taoyuan City (TW)

(*) Notice: Subject to any disclaimer, the term of this patent is extended or adjusted under 35 U.S.C. 154(b) by 175 days.

(21) Appl. No.: 18/770,645

(22) Filed: Jul. 11, 2024

(65) Prior Publication Data

US 2025/0023472 A1 Jan. 16, 2025

(30) Foreign Application Priority Data

Jul. 13, 2023 (CN) ........................ 202310861202.4
Jul. 5, 2024 (CN) ........................ 202410902639.2

(51) Int. Cl.
*H02M 3/158* (2006.01)
*H02H 7/12* (2006.01)
*H02M 1/00* (2006.01)
*H02M 3/07* (2006.01)

(52) U.S. Cl.
CPC .......... *H02M 3/158* (2013.01); *H02H 7/1213* (2013.01); *H02M 1/0009* (2021.05); *H02M 3/07* (2013.01)

(58) Field of Classification Search
CPC ...... H02M 3/158; H02M 1/0009; H02M 3/07; H02H 7/1213
See application file for complete search history.

(56) References Cited

U.S. PATENT DOCUMENTS

2021/0336529 A1* 10/2021 Zhou ...................... H02H 3/087

FOREIGN PATENT DOCUMENTS

CN 101874341 B 4/2013
CN 104795989 A 7/2015
CN 113555854 A 10/2021

* cited by examiner

*Primary Examiner* — Rafael O De Leon Domenech
(74) *Attorney, Agent, or Firm* — KIRTON McCONKIE; Evan R. Witt

(57) ABSTRACT

A flying capacitor converter, a voltage converter and an energy storage system are provided. The flying capacitor converter includes a high-voltage side, a low-voltage side, a power switch unit, a current switch unit and a current detection unit. The high-voltage side is electrically connected with a first power source. The low-voltage side is electrically connected with a second power source. The power switch unit is electrically connected between the high-voltage side and the low-voltage side and includes three terminals and four power switches. The current switch unit is electrically connected with the high-voltage side, the low-voltage side and/or a common node. The current detection unit is electrically connected between a third terminal of the power switch unit and the common node. If the current detected by the current detection unit indicates that a short-circuit condition occurs, the power switch unit is disconnected from the high-voltage side and/or the low-voltage side.

20 Claims, 5 Drawing Sheets

FLYING CAPACITOR CONVERTER, VOLTAGE CONVERTER AND ENERGY STORAGE SYSTEM WITH SAME

CROSS-REFERENCE TO RELATED APPLICATION

This application claims priority to China Patent Application No. 202310861202.4, filed on Jul. 13, 2023 and claims priority to China Patent Application No. 202410902639.2, filed on Jul. 5, 2024, the entire contents of which are incorporated herein by reference for all purposes.

FIELD OF THE INVENTION

The present disclosure relates to a converter, and more particularly to a flying capacitor converter, a voltage converter and an energy storage system with short-circuit protection.

BACKGROUND OF THE INVENTION

When compared with the conventional non-isolated two-level DC converters, multi-level DC converters are advantageous because the multi-level DC converters can use power devices with the lower withstand voltage and the filtering elements are smaller in size. Furthermore, among the multi-level circuitry topologies, flying capacitor multi-level converters are suitable for parallel connection of multiple flying capacitor converters to increase output power because their input and output terminals share a negative terminal. Consequently, flying capacitor multi-level converters have outstanding advantages in energy storage systems or rail transportation systems.

In actual applications, a DC common bus is connected with a plurality of flying capacitor converters to charge and discharge the plurality of energy storage elements. When a short-circuit occurs in one of the flying capacitor converters, the other flying capacitor converters will provide a short-circuit current to the short-circuit point. Due to the large number of flying capacitor converters, a large short-circuit current will be generated. The large short-circuit current can easily cause overcurrent and thermal damage to electronic devices. If the short-circuit current cannot be detected and eliminated in time, it will cause a larger short-circuit accident or even a fire accident.

In order to overcome the drawbacks of the conventional technologies, it is important to provide a flying capacitor converter, a voltage converter and an energy storage system with short-circuit protection.

SUMMARY OF THE INVENTION

An object of the present disclosure provides a flying capacitor converter, a voltage converter and an energy storage system with short-circuit protection. The flying capacitor converter of the energy storage system includes a current detection unit and a controller. The current detection unit detects the current flying through a common node. If the current detected by the current detection unit indicates that a short-circuit condition occurs in the flying capacitor converter, the controller controls the operations of the at least one current switch unit. Correspondingly, the power switch unit is disconnected from the high-voltage side and/or the low-voltage side. In case that a short-circuit fault occurs, the flying capacitor converter can trigger a protecting action. Under this circumstance, a large short-circuit current will not be generated, and thus the safety of the overall energy storage system will be enhanced. The current flowing through the common node in the flying capacitor converter of the energy storage system is relatively low. Since the low-current electronic component can be used as the component of the current detection unit for detecting the current flowing through the common node, the volume, the cost and the power loss of the current detection unit will be reduced. Moreover, the low-current electronic component is also suitably used as the component of the current switch unit that is serially connected with the common node. Consequently, the volume, the cost and the power loss of the current switch unit will be reduced. In this way, the efficiency of the overall energy storage system will be enhanced, and the heat dissipation treatment will become easier. Furthermore, in case that the high-voltage side and/or the low-voltage side of the flying capacitor converter is in the short-circuit condition, one or more discharge currents generated by the first power source, the second power source, the first capacitor, the second capacitor and/or the third capacitor will flow through the common node. Since the discharge currents can be rapidly detected by the current detection unit, the short-circuit detection speed of the flying capacitor converter will be increased.

In accordance with an aspect of the present disclosure, a flying capacitor converter is provided. The flying capacitor converter is electrically connected between a first power source and a second power source. The flying capacitor converter includes a high-voltage side, a low-voltage side, a common node, a power switch unit, at least one current switch unit, a current detection unit and a controller. The high-voltage side is electrically connected with the first power source. The high-voltage side includes a high-voltage positive terminal and a high-voltage negative terminal. The low-voltage side is electrically connected with the second power source. The low-voltage side includes a low-voltage positive terminal and a low-voltage negative terminal. The common node is arranged between the low-voltage negative terminal of the low-voltage side and the high-voltage negative terminal of the high-voltage side. The power switch unit is electrically connected between the high-voltage side and the low-voltage side. The power switch unit includes a first terminal, a second terminal, a third terminal, a first power switch, a second power switch, a third power switch and a fourth power switch. The first power switch, the second power switch, the third power switch and the fourth power switch are serially connected between the first terminal and the third terminal of the power switch unit. The at least one current switch unit is electrically connected with the high-voltage side, the low-voltage side and/or the common node. The current detection unit is electrically connected between the third terminal of the power switch unit and the common node. The current detection unit detects a current condition of the flying capacitor converter. The controller is electrically connected with the current detection unit and the at least one current switch unit and controls operations of the at least one current switch unit based on the current condition detected.

In accordance with another aspect of the present disclosure, a voltage converter is provided. The voltage converter includes a high-voltage side, a low-voltage side, a power switch unit, at least one current switch unit, a current detection unit and a controller. The high-voltage side and the low-voltage side are electrically connected with a common node. The power switch unit is electrically connected among the high-voltage side, the low-voltage side and the common node. The at least one current switch unit is disposed in at least one power loop of the voltage converter. The current detection unit is connected between the power switch unit and the common node for detecting a current condition of the common node. The controller is electrically connected with the current detection unit and the at least one current switch unit and controls operations of the at least one current switch unit based on the current condition detected.

In accordance with another aspect of the present disclosure, a voltage converter is provided. The voltage converter includes a high-voltage side, a low-voltage side, a power switch unit, a current switch unit, at least one current detection unit and a controller. The high-voltage side and the low-voltage side are electrically connected with a common node. The power switch unit is electrically connected among the high-voltage side, the low-voltage side and the common node. The current switch unit is electrically connected between the power switch unit and the common node. The at least one current detection unit is disposed in at least one power loop of the voltage converter and detects at least one current condition of the voltage converter. The controller is connected with the at least one current detection unit and the current switch unit and controls an operation of the current switch unit based on the at least one current condition detected.

In accordance with another aspect of the present disclosure, an energy storage system is provided. The energy storage system includes at least one above-mentioned voltage converter, a DC power source and an energy storage element. The DC power source is electrically connected with the high-voltage side of the voltage converter. The energy storage element is electrically connected with the low-voltage side of the voltage converter.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

Figure 1:
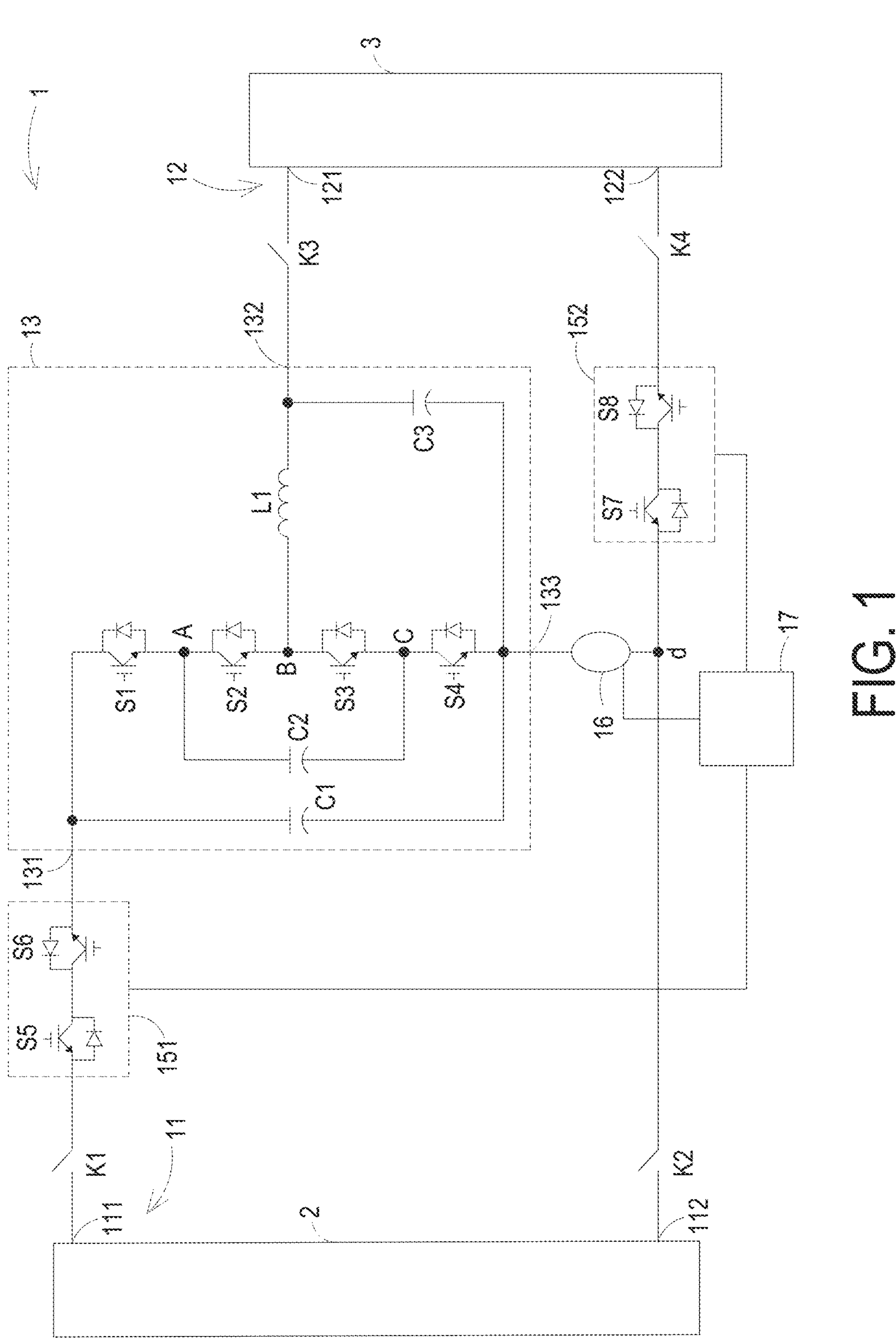
FIG. 1 is a schematic circuit diagram illustrating the circuitry topology of an energy storage system according to a first embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Although the "first", "second", "third", and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items. Unless otherwise expressly specified or limited, the term "connected" and the term "coupled" should be understood in a broad sense. For example, one element can be directly connected or coupled to another element. Alternatively, one element and another element are connected or coupled to each other through an intermediate medium.

FIG. 1 is a schematic circuit diagram illustrating the circuitry topology of an energy storage system according to a first embodiment of the present disclosure. As shown in FIG. 1, the energy storage system 4 includes a flying capacitor converter 1, a first power source 2 and a second power source 3. Preferably but not exclusively, the first power source 2 is a DC power grid or a DC common bus, and the second power source 3 is an energy storage element such as a battery or a supercapacitor. The flying capacitor converter 1 is electrically connected between the first power source 2 and the second power source 3 to perform power conversion and voltage conversion. In an embodiment, the flying capacitor converter 1 includes a high-voltage side 11, a low-voltage side 12, a common node d, and a power switch unit 13, at least one current switch unit, a current detection unit 16 and a controller 17.

The high-voltage side 11 is electrically connected with the first power source 2. In addition, the high-voltage side 11 includes a high-voltage positive terminal 111 and a high-voltage negative terminal 112. That is, the first power source 2 is electrically connected between the high-voltage positive terminal 111 and the high-voltage negative terminal 112 of the high-voltage side 11. The low-voltage side 12 is electrically connected with the second power source 3. In addition, the low-voltage side 12 includes a low-voltage positive terminal 121 and a low-voltage negative terminal 122. The second power source 3 is electrically connected between the low-voltage positive terminal 121 and the low-voltage negative terminal 122 of the low-voltage side 12. The common node d is arranged between the low-voltage negative terminal 122 of the low-voltage side 12 and the high-voltage negative terminal 112 of the high-voltage side 11.

The power switch unit 13 is electrically connected between the high-voltage side 11 and the low-voltage side 12. In addition, the power switch unit 13 includes a first terminal 131, a second terminal 132, a third terminal 133 and a plurality of power switches.

In this embodiment, the plurality of power switches include a first power switch S1, a second power switch S2, a third power switch S3 and a fourth power switch S4. The first power switch S1, the second power switch S2, the third power switch S3 and the fourth power switch S4 are serially connected between the first terminal 131 and the third terminal 133 in sequence. In addition, a first node A is connected between the first power switch S1 and the second power switch S2, a second node B is connected between the second power switch S2 and the third power switch S3, and a third node C is connected between the third power switch S3 and the fourth power switch S4.

As shown in FIG. 1, the power switch unit 13 of the flying capacitor converter 1 further includes a plurality of capacitors. For example, the plurality of capacitors includes a first capacitor C1, a second capacitor C2, and a third capacitor C3. The first capacitor C1 is electrically connected between the first terminal 131 and the third terminal 133 of the power switch unit 13. The second capacitor C2 is a flying capacitor and electrically connected between the first node A and the third node C. The third capacitor C3 is electrically connected between the second terminal 132 and the third terminal 133 of the power switch unit 13. An inductor L1 is electrically connected between the second node B and the second terminal 132 of the power switch unit 13. Due to this circuitry design, a flying capacitor three-level converter is formed.

The circuitry topology of the flying capacitor converter may be also modified. For example, in some embodiments, the flying capacitor converter includes a plurality of power switch units to form other multi-level circuit topologies known to those skilled in the art, e.g., a flying capacitor four-level converter.

In an embodiment, the current detection unit 16 is electrically connected between the third terminal 133 of the power switch unit 13 and the common node d. The current detection unit 16 is used for determining a current condition of the flying capacitor converter 1. The current detection unit 16 is used for detecting a current flying through the common node d. In other words, the current detection unit 16 determines the current condition of the flying capacitor converter 1 according to the result of detecting the current flowing through the common node d. For example, the current detection unit 16 may determine that the current condition in the high-voltage side 11 and/or the low-voltage side 12 of the flying capacitor converter 1 is in the short-circuit condition according to the result of detecting the current flowing through the common node d.

In an embodiment, the flying capacitor converter 1 includes a plurality of current switch units disposed in a plurality of power loops of the flying capacitor converter 1. For example, as shown in FIG. 1, the flying capacitor converter 1 includes a first current switch unit 151 and a second current switch unit 152. The first current switch unit 151 is disposed in a power loop between the high-voltage side 11 and the power switch unit 13. Specifically, the first current switch unit 151 is electrically connected between the high-voltage positive terminal 111 of the high-voltage side 11 and the first terminal 131 of the power switch unit 13. If the current detection unit 16 determines that the flying capacitor converter 1 is in a short-circuit condition, the power switch unit 13 and the high-voltage side 11 are disconnected from each other through the first current switch unit 151. The second current switch unit 152 is disposed in a power loop between the low-voltage side 12 and the power switch unit 13. Specifically, the second current switch unit 152 is electrically connected between the low-voltage negative terminal 122 of the low-voltage side 12 and the common node d. If the current detection unit 16 determines that the flying capacitor converter 1 is in the short-circuit condition, the power switch unit 13 and the low-voltage side 12 are disconnected from each other through the second current switch unit 152.

In an embodiment, the first current switch unit 151 includes a first current switch S5 and a second current switch S6. The first current switch S5 and the second current switch S6 are connected in reverse series. The current flowing out of the high-voltage side 11 and the current flowing into the high-voltage side 11 can be respectively transferred through the first current switch S5 and the second current switch S6.

The second current switch unit 152 includes a third current switch S7 and a fourth current switch S8. The third current switch S7 and the fourth current switch S8 are connected in reverse series. The current flowing into the low-voltage side 12 and the current flowing out of the low-voltage side 12 can be respectively transferred through the third current switch S7 and the fourth current switch S8.

In some other embodiments, each of the first current switch unit 151 and the second current switch unit 152 includes a single current switch. Consequently, the installation cost of the current switch will be reduced.

In case that the short-circuit fault does not occur or occurs with a very low probability on any of the high-voltage side 11 and the low-voltage side 12 of the flying capacitor converter 1, the flying capacitor converter 1 may only include one of the first current switch unit 151 and the second current switch unit 152. Consequently, the installation cost of the current switch unit will be reduced.

Please refer to FIG. 1 again. Each of the first current switch S5, the second current switch S6, the third current switch S7 and the fourth current switch S8 includes a controllable switch and a diode. The controller 17 is electrically connected with the first current switch S5, the second current switch S6, the third current switch S7 and the fourth current switch S8. In case that the driving signal provided from the controller 17 to each of the above current switches is in a high-level state, the current switch is in an on state. In case that the driving signal provided from the controller 17 to each of the above current switches is in a low-level state, the current switch is in an off state.

The installation positions of the first current switch unit 151 and the second current switch unit 152 may be varied according to the practical requirements. For example, in a variant example, the first current switch unit 151 is electrically connected between the high-voltage negative terminal 112 of the high-voltage side 11 and the common node d, and the second current switch unit 152 is electrically connected between the low-voltage positive terminal 121 of the low-voltage side 12 and the second terminal 132 of the power switch unit 13.

The controller 17 is electrically connected with the current detection unit 16, the first current switch unit 151 and the second current switch unit 152. The current detection unit 16 detects the current flying through the common node d. When the current detected by the current detection unit 16 indicates that a short-circuit fault occurs in the flying capacitor converter 1, the controller 17 controls the operations of all current switch units in the flying capacitor converter 1. Correspondingly, the power switch unit 13 is disconnected from the high-voltage side 11 and/or the low-voltage side 12.

For example, in case that the flying capacitor converter 1 includes the first current switch unit 151 only and the current detected by the current detection unit 16 indicates the short-circuit condition of the flying capacitor converter 1, the first current switch unit 151 is turned off under control of the controller 17. Correspondingly, the power switch unit 13 and the high-voltage side 11 are disconnected from each other. In case that the flying capacitor converter 1 includes the second current switch unit 152 only and the current detected by the current detection unit 16 indicates the short-circuit condition of the flying capacitor converter 1, the second current switch unit 152 is turned off under control of the controller 17. Correspondingly, the power switch unit 13 and the low-voltage side 12 are disconnected from each other. In case that the flying capacitor converter 1 includes the first current switch unit 151 and the second current switch unit 152 and the current detected by the current detection unit 16 indicates the short-circuit condition of the flying capacitor converter 1, the first current switch unit 151 and the second current switch unit 152 are turned off under control of the controller 17. Correspondingly, the power switch unit 13 is disconnected from the high-voltage side 11 and the low-voltage side 12.

From the above descriptions, the flying capacitor converter 1 of the energy storage system 4 includes the current detection unit 16 and the controller 17, and the current detection unit 16 is electrically connected between the third terminal 133 of the power switch unit 13 and the common node d. The current detection unit 16 detects the current flying through the common node d. When the current detected by the current detection unit 16 indicates that a short-circuit fault occurs in the flying capacitor converter 1, the controller 17 controls the operations of the first current switch unit 151 and/or the second current switch unit 152. Correspondingly, the power switch unit 13 is disconnected from the high-voltage side 11 and/or the low-voltage side 12. In case that a short-circuit fault occurs, the flying capacitor converter 1 can trigger a protecting action. Under this circumstance, a large short-circuit current will not be generated, and thus the safety of the overall energy storage system 4 will be increased.

In the circuitry topology of FIG. 1, the current flowing through the common node d is the difference between the current flowing through the low-voltage side 12 and the current flowing through the high-voltage side 11. Consequently, the current flowing through the common node d is lower than the current flowing through the low-voltage side 12. In case that the voltage at the high-voltage side 11 is greater than a half of the voltage at the low-voltage side 12, the current flowing through the common node d is also lower than the current flowing through the high-voltage side 11. In other words, the current flowing through the common node d in the flying capacitor converter 1 of the energy storage system 4 is relatively low. As a result, the low-current electronic component can be used as the component of the current detection unit 16 for detecting the current flowing through the common node d, thereby reducing the volume, the cost and the power loss of the current detection unit 16. Moreover, the low-current electronic component is also suitably used as the component of the current switch unit that is serially connected with the common node. Consequently, the volume, the cost and the power loss of the current switch unit will be reduced. In this way, the efficiency of the overall energy storage system 4 will be enhanced, and the heat dissipation treatment will become easier.

Furthermore, in case that the high-voltage side 11 and/or the low-voltage side 12 of the flying capacitor converter 1 is in the short-circuit condition, one or more discharge currents generated by the first power source 2, the second power source 3, the first capacitor C1, the second capacitor C2 and/or the third capacitor C3 will flow through the common node d. Since the discharge currents can be rapidly detected by the current detection unit 16, the short-circuit detection speed of the flying capacitor converter 1 will be increased.

Please refer to FIG. 1 again. In an embodiment, the flying capacitor converter 1 further includes four mechanical switches, i.e., a first mechanical switch K1, a second mechanical switch K2, a third mechanical switch K3 and a fourth mechanical switch K4. By controlling the on/off states of the mechanical switches of the flying capacitor converter 1, the purpose of actively controlling the connection between the high-voltage side 11 and the power switch unit 13 and/or the connection between the low-voltage side 12 and the power switch unit 13 can be achieved. The first mechanical switch K1 is electrically connected between the high-voltage positive terminal 111 of the high-voltage side 11 and the first current switch element 151. The second mechanical switch K2 is electrically connected between the high-voltage negative terminal 112 of the high-voltage side 11 and the common node d. The third mechanical switch K3 is electrically connected between the low-voltage positive terminal 121 of the low-voltage side 12 and the second terminal 132 of the power switch element 13. The fourth mechanical switch K4 is electrically connected between the low-voltage negative terminal 122 of the low voltage side 12 and the second current switch unit 152. In some embodiments, the flying capacitor converter includes only at least one of the first mechanical switch K1, the second mechanical switch K2, the third mechanical switch K3 and the fourth mechanical switch K4. For example, the flying capacitor converter includes a single mechanical switch or two mechanical switches. Consequently, the installation cost will be reduced.

Figure 2:
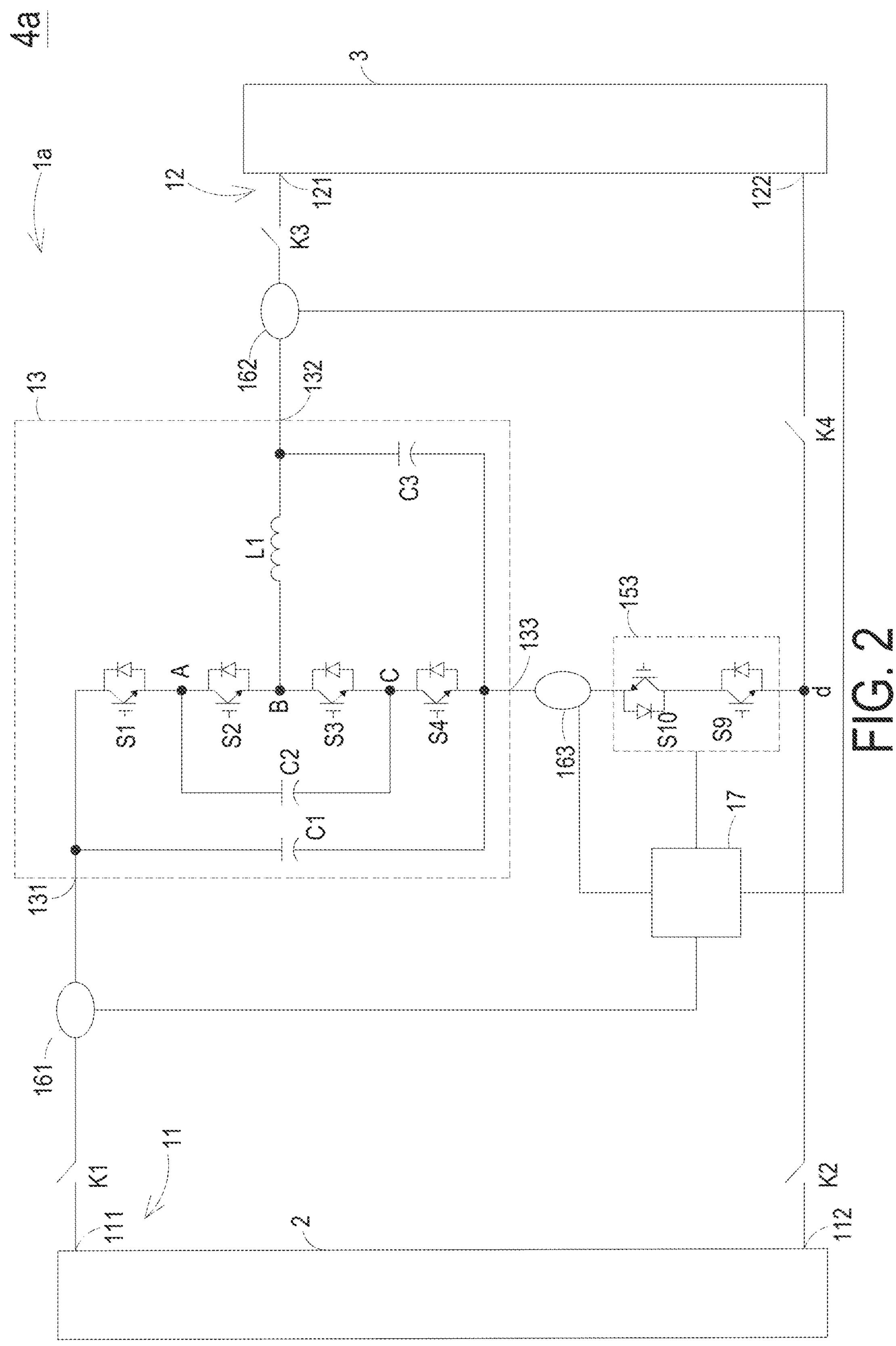
FIG. 2 is a schematic circuit diagram illustrating the circuitry topology of an energy storage system according to a second embodiment of the present disclosure.

FIG. 2 is a schematic circuit diagram illustrating the circuitry topology of an energy storage system according to a second embodiment of the present disclosure. In comparison with the flying capacitor converter 1 of FIG. 1 including two current switch units, the flying capacitor converter 1*a* of this embodiment includes a single current switch unit, i.e., a third current switch unit 153. The third current switch unit 153 is disposed in a power loop between the power switch unit 13 and the common node d. Specifically, the third current switch unit 153 is electrically connected between the third terminal 133 of the power switch unit 13 and the common node d.

In an embodiment, the third current switch unit 153, includes a fifth current switch S9 and a sixth current switch S10. The fifth current switch S9 and the sixth current switch S10 are connected in reverse series. The current flowing out of the power switch unit 13 and the current flowing into the power switch unit 13 can be respectively transferred through the fifth current switch S9 and the sixth current switch S10.

In some other embodiments, the third current switch unit 153 includes a single current switch. Consequently, the installation cost of the current switch will be reduced.

Please refer to FIG. 2 again. Each of the fifth current switch S9 and the sixth current switch S10 includes a controllable switch and a diode. The controller 17 is electrically connected with the fifth current switch S9 and the sixth current switch S10. In case that the driving signal provided from the controller 17 to each of the above current switches is in a high-level state, the current switch is in an on state. In case that the driving signal provided from the controller 17 to each of the above current switches is in a low-level state, the current switch is in an off state.

In the energy storage system 4 of FIG. 1, the current detection unit 16 of the flying capacitor converter 1 is electrically connected between the third terminal 133 of the power switch unit 13 and the common node d. In the energy storage system 4*a* of this embodiment, the current detection unit of the flying capacitor converter 1*a* may be electrically connected with the high-voltage side 11, the low-voltage side 12 and/or the common node d of the flying capacitor converter 1*a*. As shown in FIG. 2, the flying capacitor converter 1*a* includes a first current detection unit 161, a second current detection unit 162 and a third current detection unit 163. The first current detection unit 161 is electrically connected with the high-voltage side 11 for detecting the short-circuit condition of the high-voltage side 11. The first current detection unit 161 is also referred to as a high-voltage side current detection unit. Specifically, the first current detection unit 161 is electrically connected between the high-voltage positive terminal 111 of the high-voltage side 11 and the first terminal 131 of the power switch unit 13. The first current detection unit 161 can be used to detect the short-circuit condition (i.e., current condition) between the high-voltage side 11 and the power switch unit 13. The second current detection unit 162 is electrically connected with the low-voltage side 12 for detecting the short-circuit condition of the low-voltage side 12. The second current detection unit 162 is also referred to as a low-voltage side current detection unit. Specifically, the second current detection un it 162 is electrically connected between the low-voltage positive terminal 121 of the low voltage side 12 and the second terminal 132 of the power switch unit 13. The second current detection unit 162 can be used to detect the short-circuit condition (i.e., current condition) between the low-voltage side 12 and the power switch unit 13. The third current detection unit 163 is electrically connected between the power switch unit 13 and the common node d. Specifically, the third current detection unit 163 is electrically connected between the third terminal 133 of the power switch unit 13 and the common node d. The third current detection unit 163 can be used to simultaneously detect the short-circuit condition between the high-voltage side 11 and the power switch unit 13 and the short-circuit condition between the low-voltage side 12 and the power switch unit 13.

In some other embodiments, the first current detection unit 161 is further electrically connected with the node between the high-voltage negative terminal 112 of the high-voltage side 11 and the common node d, and the second current detection unit 162 is further electrically connected with the node between the low-voltage negative terminal 122 of the low-voltage side 12 and the common node d. It is noted that the number of the current detection unit is not limited to the above-mentioned embodiment and is adjusted according to the practical requirements. In some embodiments, the flying capacitor converter 1*a* of the energy storage system 4*a* may omit the first current detection unit 161 and the second current detection unit 162.

However, the installations of the first current detection unit 161, the second current detection unit 162 and the third current detection unit 163 may be adjusted according to the practical requirements. For example, in case that the short-circuit fault does not occur or occurs with a very low probability on the high-voltage side 11 of the flying capacitor converter 1*a*, the flying capacitor converter 1*a* may only include one of the second current detection unit 162 and the third current detection unit 163 or include the first current detection unit 161 and the second current detection unit 162 but omit the third current detection unit 163.

In this embodiment, the third current switch unit 153 is electrically connected between the third terminal 133 of the power switch unit 13 and the common node d. Consequently, the protecting functions can be achieved in the following short-circuit conditions. These short-circuit conditions include a short-circuit condition between the first terminal 131 and the third terminal 133 of the power switch unit 13, a short-circuit condition between the second terminal 132 and the third terminal 133 of the power switch unit 13, a short circuit condition between the low-voltage positive terminal 121 and the low-voltage negative terminal 122 of the low-voltage side 12, a short circuit condition between the low-voltage positive terminal 121 of the low-voltage side 12 and the high-voltage negative terminal 112 of the high-voltage side 11, and a short circuit condition between the high-voltage positive terminal 111 of the high-voltage side 11 and the low-voltage negative terminal 122 of the low-voltage side 12. In case that any of the above short-circuit conditions occurs, the short-circuit loop can be completely disconnected by turning off the third current switch unit 153.

In the flying capacitor converter 1*a* of the energy storage system 4*a*, the third current detection unit 163 and the third current switch unit 153 are electrically connected between the third terminal 133 of the power switch unit 13 and the common node d. The positions of the third current switch unit 153 and the third current detection unit 163 may be exchanged. For example, the third current switch unit 153 is electrically connected between the third terminal 133 of the power switch unit 13 and the third current detection unit 163, and the third current detection unit 163 is electrically connected between the third current switch unit 153 and the common node d. Alternatively, the third current detection unit 163 is electrically connected between the third terminal 133 of the power switch unit 13 and the third current switch unit 153, and the third current switch unit 153 is electrically connected between the third current detection unit 163 and the common node d.

Figure 3:
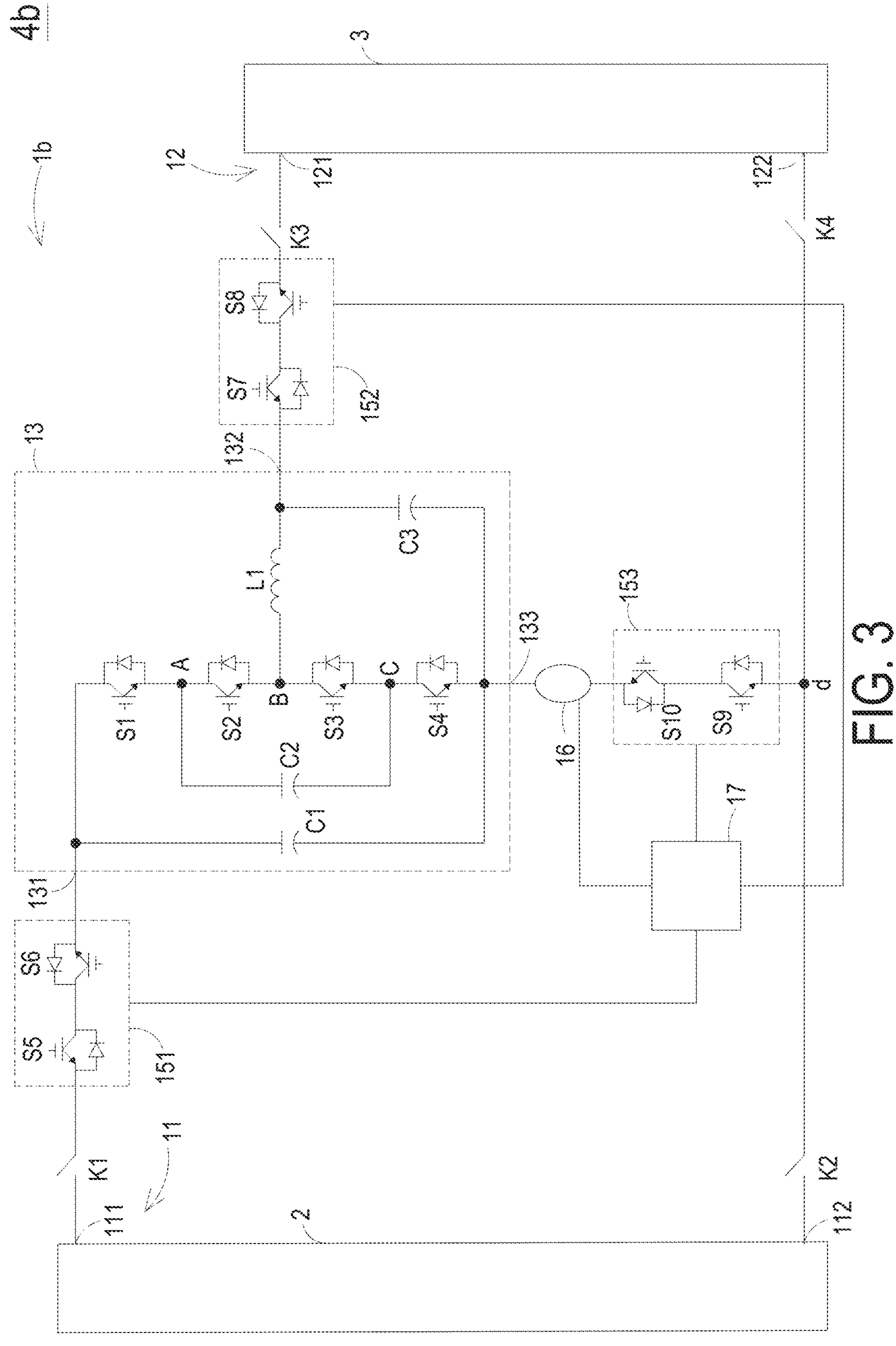
FIG. 3 is a schematic circuit diagram illustrating the circuitry topology of an energy storage system according to a third embodiment of the present disclosure.

FIG. 3 is a schematic circuit diagram illustrating the circuitry topology of an energy storage system according to a third embodiment of the present disclosure. In comparison with the flying capacitor converter 1 of FIG. 1, the flying capacitor converter 1*b* of this embodiment further includes a third current switch unit 153. The third current switch element 153 is electrically connected between the current detection unit 16 and the common node d. That is, the current detection unit 16 and the third current switch unit 153 are serially connected between the third terminal 133 of the power switch unit 13 and the common node d.

The positions of the third current switch unit 153 and the current detection unit 16 may be exchanged. That is, in a variant example, the third current switch unit 153 is electrically connected between the third terminal 133 of the power switch unit 13 and the current detection unit 16, and the current detection unit 16 is electrically connected between the third current switch unit 153 and the common node d.

In this embodiment, the flying capacitor converter 1*b* of the energy storage system 4*b* further includes a first current switch unit 151 and/or a second current switch unit 152. The first current switch unit 151 is electrically connected to the high-voltage side 11 of the flying capacitor converter 1*b*. The second current switch unit 152 is electrically connected to the low-voltage side 12 of the flying capacitor converter 1*b*. For example, the first current switch unit 151 is electrically connected between the high-voltage positive terminal 111 of the high-voltage side 11 and the first terminal 131 of the power switch unit 13, or the first current switch unit 151 is electrically connected between the high-voltage negative terminal 112 of the high-voltage side 11 and the common node d. For example, the second current switching unit 152 is electrically connected between the low-voltage positive terminal 121 of the low voltage side 12 and the second terminal 132 of the power switching unit 13, or the second current switching unit 152 is electrically connected between the low-voltage negative terminal 122 of the low-voltage side 12 and the common node d.

In this embodiment, the first current switch unit 151 is electrically connected to the high-voltage side 11 of the flying capacitor converter 1*b*, and/or the second current switch unit 152 is electrically connected to the low-voltage side 12 of the flying capacitor converter 1*b*. Consequently, the protecting functions in various short-circuit conditions described in the second embodiment can be achieved. Furthermore, due to this circuitry design, the protecting functions in the short-circuit condition between the high-voltage positive terminal 111 of the high-voltage side 11 and the low-voltage positive terminal 121 of the low-voltage side 12 and the protecting functions in the short-circuit condition between the high-voltage negative terminal 112 of the high-voltage side 11 and the low-voltage negative terminal 122 of the low-voltage side 12 can be achieved.

In an embodiment, the third current switch unit 153 includes a fifth current switch S9 and a sixth current switch S10. The fifth current switch S9 and the sixth current switch S10 are connected in reverse series. The current flowing into the power switching unit 13 and the current flowing out of the power switching unit 13 can be respectively transferred through the fifth current switch S9 and the sixth current switch S10. In some other embodiments, the third current switch unit 153 includes a single current switch. Consequently, the installation cost of the current switch will be reduced.

Like the first embodiment, the flying capacitor converter 1*a* of the second embodiment or the flying capacitor converter 1*b* of the third embodiment further includes four mechanical switches, i.e., a first mechanical switch K1, a second mechanical switch K2, a third mechanical switch K3 and a fourth mechanical switch K4. The operations and purposes of the first mechanical switch K1, the second mechanical switch K2, the third mechanical switch K3 and the fourth mechanical switch K4 in each of the second embodiment and the third embodiment are similar to those of the first embodiment, and not redundantly described herein.

Figure 4:
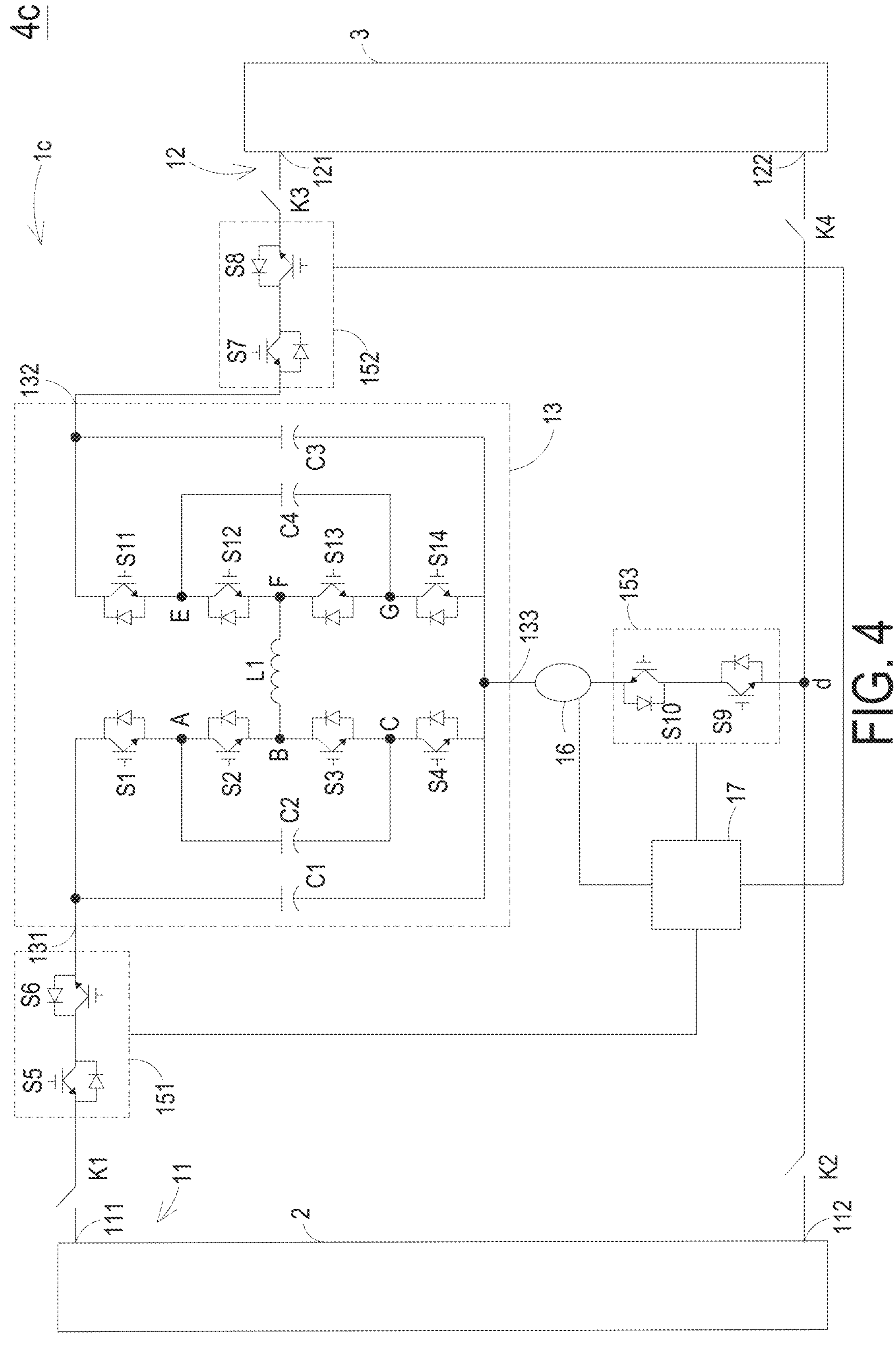
FIG. 4 is a schematic circuit diagram illustrating the circuitry topology of an energy storage system according to a fourth embodiment of the present disclosure.

FIG. 4 is a schematic circuit diagram illustrating the circuitry topology of an energy storage system according to a fourth embodiment of the present disclosure. In comparison with the flying capacitor converter 1*b* of the energy storage system 4*b* of FIG. 3, the energy storage system 4*c* of this embodiment includes a voltage converter 1*c*. The number of the power switches and the capacitors in the power switch unit 13 of the voltage converter 1*c* is greater. For example, the power switch unit 13 further includes a fifth power switch S11, a sixth power switch S12, a seventh power switch S13, an eighth power switch S14 and a fourth capacitor C4. The fifth power switch S11, the sixth power switch S12, the seventh power switch S13 and the eighth power switch S14 are serially connected between the second terminal 132 and the third terminal 133 in sequence. A fourth node E is connected between the fifth power switch S11 and the sixth power switch S12, a fifth node F is connected between the sixth power switch S12 and the seventh power switch S13, and a seventh node G is connected between the seventh power switch S13 and the eighth power switch S14. The fourth capacitor C4 is electrically connected between the fourth node E and the seventh node G. In this embodiment, the inductor L1 is electrically connected between the second node B and the fifth node F. In this embodiment, the power switch unit 13 includes a buck-boost circuitry topology. The energy storage system 4*c* includes a current detection unit and a current switch unit (refer to FIGS. 1 to 3). The circuits and functions of the current detection unit and the current switch unit are similar to that of the first embodiment, the second embodiment, or the third embodiment and are not redundantly described hereinafter. It is noted that the power switch unit 13 of the voltage converter 1*c* of the energy storage system 4*c* is applicable to the energy storage system as shown in FIGS. 1 and 2, and is not redundantly described herein.

Of course, the numbers and positions of the at least one current detection unit and the at least one current switch unit in the flying capacitor converter or the voltage converter of the energy storage system may be varied according to the practical requirements.

Figure 5:
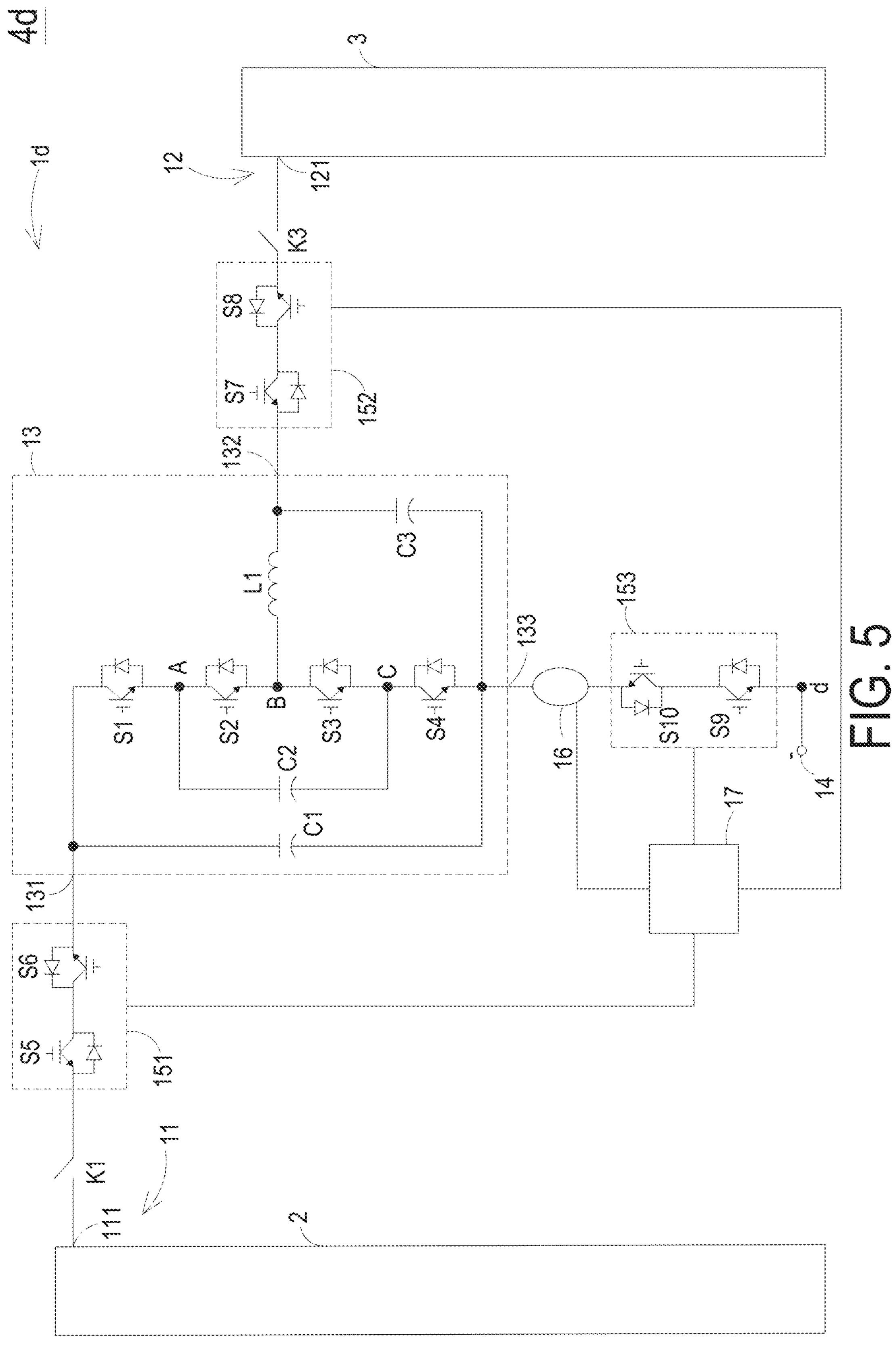
FIG. 5 is a schematic circuit diagram illustrating the circuitry topology of an energy storage system according to a fifth embodiment of the present disclosure.

In some embodiments, the voltage converter of the energy storage system includes three terminals only. For example, the voltage converter includes a high voltage positive terminal, a low voltage positive terminal and a common negative terminal. FIG. 5 is a schematic circuit diagram illustrating the circuitry topology of an energy storage system according to a fifth embodiment of the present disclosure. In comparison with the energy storage system 4*b* of FIG. 3, the energy storage system 4*d* of this embodiment includes a high-voltage positive terminal 111, a low-voltage positive terminal 121 and a common negative terminal 14. The common negative terminal 14 is electrically connected with the common node d and used as a negative terminal of the high-voltage side 11 and the low-voltage side 12. In comparison with the energy storage system having four terminals, the number of the wires or cables used in the energy storage system 4*d* is reduced. The circuits and functions of the current detection unit and the current switch unit are similar to that of the first embodiment, the second embodiment, or the third embodiment and are not redundantly described hereinafter.

From the above descriptions, the present disclosure provides a converter in which the input and the output have a common node, such as a voltage converter, especially a flying capacitor converter. The flying capacitor converter and the voltage converter of the energy storage system includes the current detection unit and the controller. The current detection unit is electrically connected between the power switch unit and the common node, and is configured to detect a current flowing the common node. When the current detected by the current detection unit indicates the short-circuit condition occurs in the flying capacitor converter and the voltage converter, the controller controls the operations of the at least one current switch unit. Correspondingly, the power switch unit is disconnected from the high-voltage side and/or the low-voltage side. In case that a short-circuit fault occurs, the flying capacitor converter and the voltage converter can trigger a protecting action respectively. Under this circumstance, a large short-circuit current will not be generated, and thus the safety of the overall energy storage system will be enhanced.

The current flowing through the common node in the flying capacitor converter and the voltage converter of the energy storage system is relatively low. As a result, the low-current electronic component can be used as the component of the current detection unit for detecting the current flowing through the common node, thereby reducing the volume, the cost and the power loss of the current detection unit. Moreover, the low-current electronic component is also suitably used as the component of the current switch unit that is serially connected with the common node. Consequently, the volume, the cost and the power loss of the current switch unit will be reduced. In this way, the efficiency of the overall energy storage system will be enhanced, and the heat dissipation treatment will become easier. Specially, the converter is a flying capacitor converter. In case that the high-voltage side and/or the low-voltage side of the flying capacitor converter is in the short-circuit condition, one or more discharge currents generated by the first power source, the second power source, the first capacitor, the second capacitor and/or the third capacitor will flow through the common node. Since the discharge currents can be rapidly detected by the current detection unit, the short-circuit detection speed of the flying capacitor converter will be increased.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A flying capacitor converter electrically connected between a first power source and a second power source, the flying capacitor converter comprising:

- a high-voltage side electrically connected with the first power source, and comprising a high-voltage positive terminal and a high-voltage negative terminal;
- a low-voltage side electrically connected with the second power source, and comprising a low-voltage positive terminal and a low-voltage negative terminal;
- a common node arranged between the low-voltage negative terminal of the low-voltage side and the high-voltage negative terminal of the high-voltage side;
- a power switch unit electrically connected between the high-voltage side and the low-voltage side, and comprising a first terminal, a second terminal, a third terminal, a first power switch, a second power switch, a third power switch and a fourth power switch, wherein the first power switch, the second power switch, the third power switch and the fourth power switch are serially connected between the first terminal and the third terminal of the power switch unit;
- at least one current switch unit electrically connected with the high-voltage side, the low-voltage side and/or the common node;
- a current detection unit electrically connected between the third terminal of the power switch unit and the common node and configured to detect a current condition of the flying capacitor converter; and
- a controller electrically connected with the current detection unit and the at least one current switch unit and configured to control operations of the at least one current switch unit based on the current condition detected.

2. The flying capacitor converter according to claim 1, wherein when the current condition detected by the current detection unit indicates that a short-circuit condition occurs, the controller controls the at least one current switch unit to disconnect the power switch unit from the high-voltage side and/or the low-voltage side.

3. The flying capacitor converter according to claim 1, wherein the at least one current switch unit comprises a first current switch unit and/or a second current switch unit, wherein the first current switch unit is electrically connected between the high-voltage positive terminal of the high-voltage side and the first terminal of the power switch unit or electrically connected between the high-voltage negative terminal of the high-voltage side and the common node, and/or the second current switch unit is electrically connected between the low-voltage negative terminal of the low-voltage side and the common node or electrically connected between the low-voltage positive terminal of the low-voltage side and the second terminal of the power switch unit.

4. The flying capacitor converter according to claim 1, wherein the at least one current switch unit comprises a third current switch unit, wherein the third current switch unit and the current detection unit are serially connected between the third terminal of the power switch unit and the common node.

5. The flying capacitor converter according to claim 1, wherein each of the at least one current switch unit comprises two current switches that are connected in reverse series, or each of the at least one current switch unit comprises a single current switch.

6. The flying capacitor converter according to claim 1, wherein the flying capacitor converter further includes at least one mechanical switch, wherein the at least one mechanical switch is electrically connected with the high-voltage positive terminal of the high-voltage side, the high-voltage negative terminal of the high-voltage side, the low-voltage positive terminal of the low-voltage side and/or the low-voltage negative terminal of the low voltage side.

7. The flying capacitor converter according to claim 1, wherein a current flowing through the common node is a difference between a current flowing through the low-voltage side and a current flowing through the high-voltage side;

- a current flowing through the common node is lower than a current flowing through the low-voltage side; and
- the current detection unit is configured to detect the current flowing through the common node.

8. A voltage converter, comprising:

- a high-voltage side and a low-voltage side electrically connected with a common node;
- a power switch unit electrically connected among the high-voltage side, the low-voltage side and the common node;
- at least one current switch unit disposed in at least one power loop of the voltage converter;
- a current detection unit electrically connected between the power switch unit and the common node and configured to detect a current condition of the common node; and
- a controller electrically connected with the current detection unit and the at least one current switch unit and configured to control operations of the at least one current switch unit based on the current condition detected.

9. The voltage converter according to claim 8, wherein when the current condition detected by the current detection unit indicates that a short-circuit condition occurs, the controller controls the at least one current switch unit to disconnect the power switch unit from the high-voltage side and/or the low-voltage side.

10. The voltage converter according to claim 8, wherein the at least one current switch unit comprises a first current switch unit and/or a second current switch unit, wherein the first current switch unit is disposed in the power loop between the high-voltage side and the power switch unit, and/or the second current switch unit is disposed in the power loop between the low-voltage side and the power switch unit.

11. The voltage converter according to claim 8, wherein the at least one current switch unit comprises a third current switch unit, wherein the third current switch unit and the current detection unit are serially connected between the power switch unit and the common node.

12. The voltage converter according to claim 8, wherein a current flowing through the common node is a difference between a current flowing through the low-voltage side and a current flowing through the high-voltage side;

a current flowing through the common node is lower than a current flowing through the low-voltage side; and the current detection unit is configured to detect the current flowing through the common node.

13. A voltage converter, comprising:

a high-voltage side and a low-voltage side electrically connected with a common node;

a power switch unit electrically connected among the high-voltage side, the low-voltage side and the common node;

a current switch unit electrically connected between the power switch unit and the common node;

at least one current detection unit disposed in at least one power loop of the voltage converter and configured to detect at least one current condition of the voltage converter; and a controller electrically connected with the at least one current detection unit and the current switch unit and configured to control an operation of the current switch unit based on the at least one current condition detected.

14. The voltage converter according to claim 13, wherein when the at least one current condition detected by the at least one current detection unit indicates that a short-circuit condition occurs, the controller controls the current switch unit to disconnect the power switch unit from the high-voltage side and the low-voltage side.

15. The voltage converter according to claim 13, wherein the at least one current detection unit comprises a current detection unit, serially connected with the current switch unit between the power switch unit and the common node.

16. The voltage converter according to claim 13, wherein the at least one current detection unit comprises:

a high-voltage side current detection unit electrically connected with the high-voltage side and configured to detect a current condition of the high-voltage side, and/or a low-voltage side current detection unit electrically connected with the low-voltage side and configured to detect a current condition of the low-voltage side; and the controller electrically connected with the high-voltage side current detection unit and/or the low-voltage side current detection unit, wherein when one of the current conditions detected indicates that the short-circuit condition occurs, the controller controls the current switch unit to disconnect the power switch unit from the high-voltage side and/or the low-voltage side.

17. The voltage converter according to claim 13, wherein a current flowing through the common node is a difference between a current flowing through the low-voltage side and a current flowing through the high-voltage side;

a current flowing through the common node is lower than a current flowing through the low-voltage side; and the current detection unit is configured to detect the current flowing through the common node.

18. An energy storage system, comprising:

at least one voltage converter, wherein each of the at least one voltage converter comprising:

a high-voltage side and a low-voltage side electrically connected with a common node;

a power switch unit electrically connected among the high-voltage side, the low-voltage side and the common node;

a current switch unit electrically connected between the power switch unit and the common node; and at least one current detection unit disposed in at least one power loop of the voltage converter and configured to detect at least one current condition of the voltage converter;

a DC power source electrically connected with the high-voltage side of the at least one voltage converter; and an energy storage element electrically connected with the low-voltage side of the voltage converter.

19. The energy storage system according to claim 18, wherein each of the at least one voltage converter further comprises: a controller electrically connected with the current switch unit and the at least one current detection unit and configured to control an operation of the current switch unit based on the at least one current condition detected.

20. The energy storage system according to claim 19, wherein when the at least one current condition detected indicates that a short-circuit condition occurs, the controller controls the current switch unit to disconnect the power switch unit from the high-voltage side and the low-voltage side.

* * * * *